United States Patent
Hennrich et al.

[19]

[11] Patent Number: 6,105,876
[45] Date of Patent: Aug. 22, 2000

[54] HEATING SYSTEM FOR VEHICLES

[75] Inventors: Werner Hennrich, Fellbach; Bernhard Umlauf, Seefeld, both of Germany

[73] Assignee: DaimlerChrysler Corporation, Auburn Hills, Mich.

[21] Appl. No.: 09/468,245

[22] Filed: Dec. 20, 1999

[30] Foreign Application Priority Data

Dec. 24, 1998 [DE] Germany .......................... 198 60 252

[51] Int. Cl.$^7$ .................................................. B60H 1/02
[52] U.S. Cl. .................................. 237/12.3 B; 237/12.3 R
[58] Field of Search ..................... 237/12.3 R, 12.3 B; 122/26; 126/247

[56] References Cited

U.S. PATENT DOCUMENTS

| 4,993,377 | 2/1991 | Itakura | 123/142.1 R |
| 5,573,184 | 11/1996 | Martin | 237/12.3 R |

FOREIGN PATENT DOCUMENTS 44 36 943 C 2  5/1997  Germany .

*Primary Examiner*—Harold Joyce
*Assistant Examiner*—Derek S. Boles

*Attorney, Agent, or Firm*—Marc Lorelli

[57] ABSTRACT

A vehicle heating system having an additional heating component that can operate independently of the internal combustion engine is provided. When the additional heating component is not operating, the water flows through the coolant circuit loop between the internal combustion engine and the typical heat exchanger in a customary manner. The additional heating component includes a thermostatically actuated switching element which is designed in such a way that with the additional heating component operating, the water heated thereby flows exclusively through the traditional heat exchanger at a temperature below that set by the thermostatically actuated switching element. At a water temperature above that set by the thermostatically actuated switching element, the coolant heated by the additional heating component flows through the traditional heat exchanger and additionally through the internal combustion engine. In order to provide sufficient flow of coolant from the additional heating component through the internal combustion engine a device for creating a vacuum is disposed in the coolant circuit at the point where water flowing through the additional heating component enters the coolant circuit.

4 Claims, 2 Drawing Sheets

HEATING SYSTEM FOR VEHICLES

CROSS REFERENCE TO RELATED APPLICATION

Priority is claimed with respect to German Application No. 198 60 252.9-16 filed in Germany on Dec. 24, 1998, the disclosure of which is incorporated herein by reference.

BACKGROUND OF THE INVENTION

1. Technical Field

The invention relates to a heating system for vehicles. More particularly, the invention relates to a heating system for a motor vehicle that includes an additional heater element.

2. Discussion

A heating system of the generic type is known from DE 44 36 943 C2, this system having, on the one hand, a heater connected to the coolant circuit of the internal combustion engine and, on the other hand, an additional heater independent of the internal combustion engine. The additional heater heats the heating water, the temperature of which is below a temperature set by the thermostat. With the additional heater switched off, the heated engine coolant flows via the heat exchanger, for which purpose the switching element has an inlet chamber, which is connected to the cooling circuit of the internal combustion engine, and a discharge chamber, which is connected both to the heat exchanger and to the additional heater, and also has a nonreturn valve which is arranged between the inlet and the discharge chamber and the shut-off direction of which is towards the engine. The nonreturn valve has an actuating element which raises the valve element of the nonreturn valve from its valve seat above a predetermined temperature in the inlet chamber.

This manner of operating a heating system has the disadvantage that when the engine is running, especially in the high engine-speed range, the pressure in the coolant circuit is so high that the heating water heated by the additional heater cannot enter the coolant circuit. The pressure of the heating water has to be increased with the aid of a more powerful pump to allow the heating water to enter the cooling circuit. More powerful pumps have the disadvantage that they are expensive and large. Thus, more space must be provided for the installation of a larger pump, and this is not available, particularly in vehicle construction.

SUMMARY OF THE INVENTION

It is therefore the object of the invention to improve the fundamental manner of operation of the engine heating and stationary heating systems, particularly when the engine is running.

Another objective of the present invention is to provide a vehicle heating system with an additional heating element that can operate independently of the internal combustion engine. The additional heating system includes a thermostatically actuated switching element which is designed in such a way that with the additional heating system operating, the coolant heated thereby flows exclusively through the traditional heat exchanger at a temperature below that set by the thermostatically actuated switching element. At a coolant temperature above that set by the thermostatically actuated switching element, the coolant heated by the additional heating system flows through the traditional heat exchanger and additionally through the internal combustion engine. Advantageous refinements and developments of the subject matter of the invention are characterized by the features of the subclaims.

One significant advantage of these configurations is that a simple and low-cost device is sufficient to enable the additional heating system to be used, particularly with the engine running, when the pressure in the coolant circuit rises to a high level. Particularly when the vehicle is started, the waste heat from the engine is not sufficient to heat the coolant circuit and hence the vehicle. In addition, the additional heating system is usually used to heat the coolant circuit in order to heat the engine when starting, acting as an engine heating system. For rapid heating of the vehicle when the vehicle is being started, the heating water heated by the additional heating system is therefore fed into the coolant circuit for the purpose of additional heating. Thanks to the device according to the invention, the flow of heating water supplied by the stationary heating system to the vehicle heating system can enter the cooling circuit in a simple manner, despite the fact that the engine is running.

BRIEF DESCRIPTION OF THE DRAWINGS

Additional benefits and advantages of the present invention will become apparent to those skilled in the art to which this invention relates from a reading of the subsequent description of the preferred embodiment and the appended claims, taken in conjunction with the accompanying drawings.

The invention will be explained in greater detail with reference to an illustrative embodiment in conjunction with a description of the figures, of which

DETAILED DESCRIPTION OF THE DRAWINGS

Figure 1:
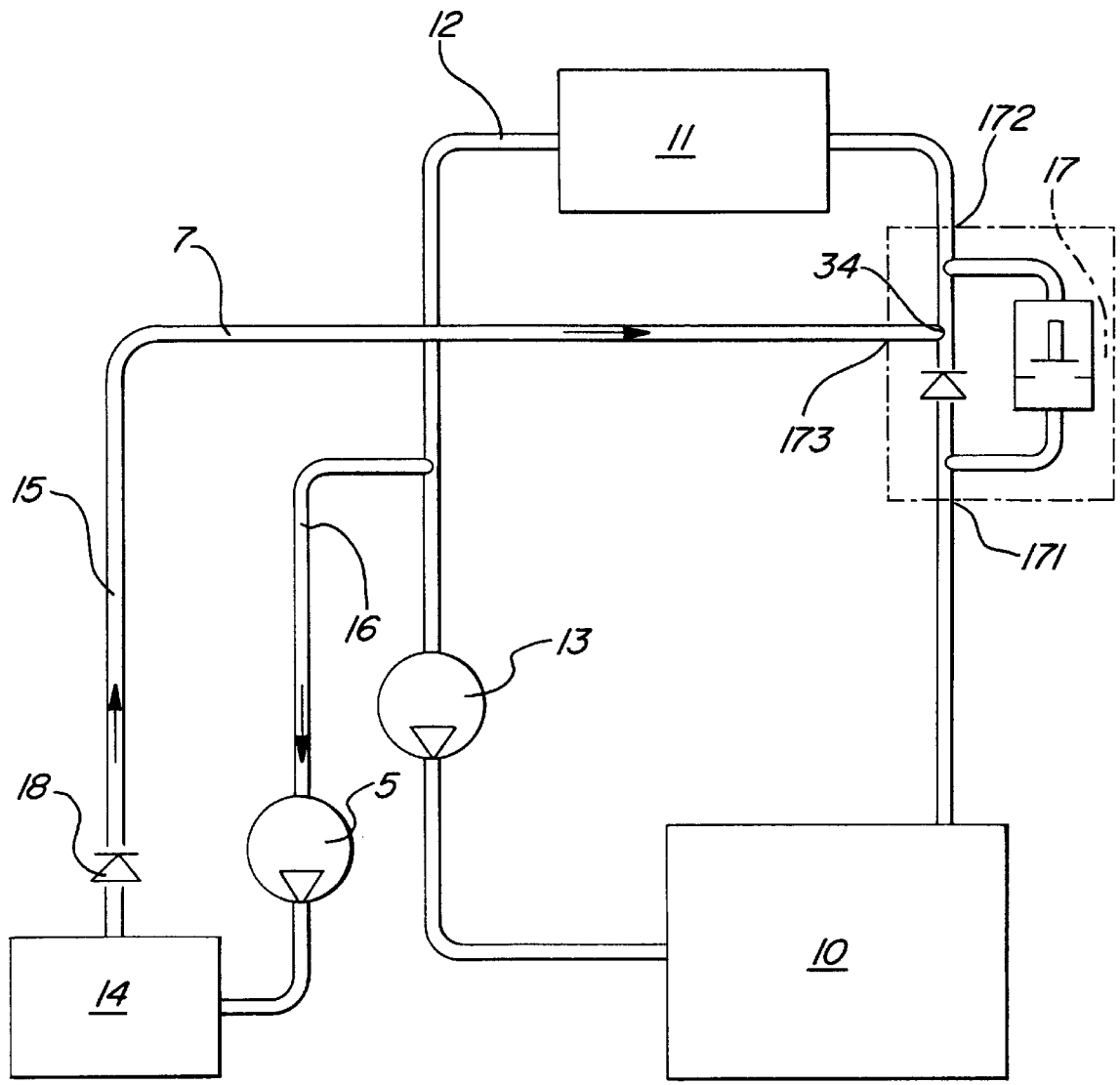
FIG. 1 shows a schematic representation of a heating system for vehicles with a water-cooled internal combustion engine and FIG. 2 shows a longitudinal section through the outlet of the additional heating circuit into the coolant circuit in the heating system shown in FIG. 1.

In the heating system illustrated schematically in FIG. 1 for a vehicle with a water-cooled internal combustion engine, the internal combustion engine is symbolized by the block 10, and 11 denotes the water/air heat exchanger of the heating system, this heat exchanger being connected on the water side to the coolant circuit 12 of the internal combustion engine 10, in which there is furthermore inserted an electric water pump 13 for circulating the coolant heated up by the internal combustion engine 10. When the internal combustion engine 10 is at its operating temperature and there is a heating requirement, air is passed via the heat exchanger 11 and introduced into the passenger compartment of the motor vehicle. The air flowing through the heat exchanger 11 absorbs heat from the coolant here and, for its part, heats the passenger compartment. To heat the passenger compartment when the internal combustion engine 10 is stationary, i.e. for what are referred to as stationary heating applications, an additional heater 14 is provided, this being connected to the heat exchanger 11 in parallel with the coolant circuit 12 by connection lines 15 and 16. In this embodiment as a heater, the additional heater 14 comprises a fuel burner by means of which the water passed through the additional heater 14 is heated up, and a recirculating pump 5 for generating a flow of water through the additional heater 14. A switching element 17 with three connections 171, 172 and 173 is inserted in the coolant circuit 12 between the coolant outlet of the internal combustion engine 10 and the inlet of the heat exchanger 11 to allow the heat exchanger 11 to be operated either with the coolant circuit 12 of the internal combustion engine 10 or the additional heater 14. In this arrangement, connection 171 is connected to the internal combustion engine 10, connection 172 is connected to the heat exchanger 11 and connection 173 is connected to the connection line 15 of the additional heater 14, the latter line acting as an inlet line to the switching element 17 and, for this purpose contains a nonreturn valve 18, the direction of flow through which is from the additional heater 14 towards the switching element 17 acting connection line 16 of the additional heater 14. The connection line 16 of the additional heater 14 acting as a return line is connected to the coolant circuit 12 between the outlet of the heat exchanger 11 and the inlet of the water pump 13. The connection line 15 acting as the inlet line opens into the coolant circuit 12 at point 34. The heating water heated by the additional heater 14 is then added to the coolant circuit 12 at point 34.

Figure 2:
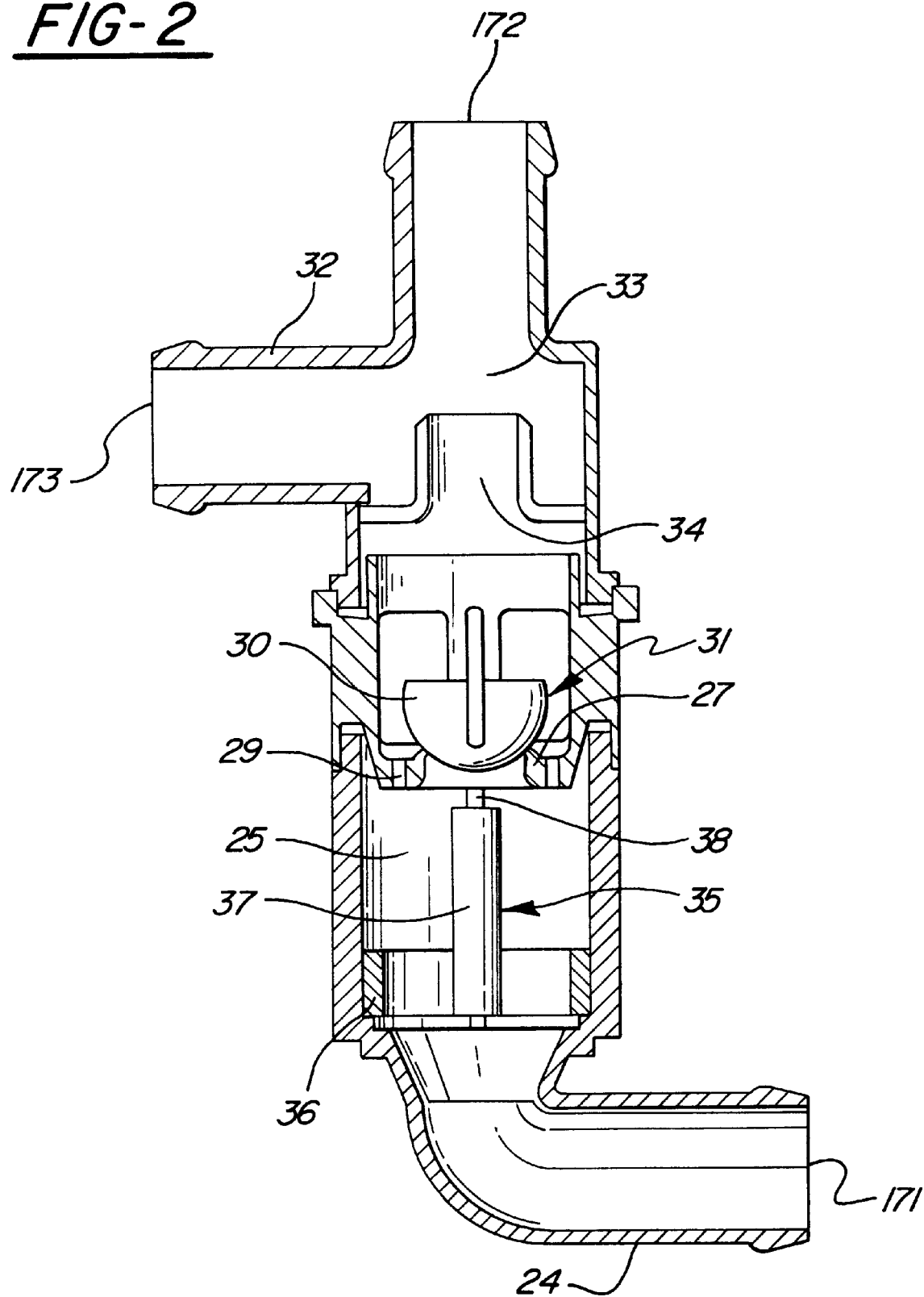

FIG. 2 shows a longitudinal section through the outlet of the additional heating circuit into the coolant circuit in the heating system shown in FIG. 1. This longitudinal section will be described with reference to the action of the heating system described: when the internal combustion engine 10 is stationary and the additional heater 14 is switched on, hot water comes from the additional heater 14, via connection line 15, to the connection stub 32, where it presses the valve element 30 onto the valve seat 27 and flows onwards to the heat exchanger 11, where it releases its heat to the air flowing through the heat exchanger 11 and passes via connection line 16 back to the additional heater 14, where it is heated up again. The air heated in the heat exchanger 11 is fed to the passenger compartment and the latter is heated up. During this process, relatively small quantities of hot water pass via the leakage holes 29 into the inlet chamber 25 and here heat the thermostat 35. The increase in temperature causes the wax in the wax cartridge 37 to expand, and the actuating pin 38 gradually pushes in the direction of the valve element 30. Once the predetermined nominal temperature has been reached, the actuating pin 38 lifts the valve element 30 from the valve seat 27. Hot water now also flows out of the inlet chamber 25, via the opened nonreturn valve 31, into the discharge chamber 34 and, from here, passes via the connection stub 24 to the internal combustion engine 10. In this position of the switching element 17, the hot water heated up by the additional heater 14 also flows through the internal combustion engine 10 via the coolant circuit 12 and gradually heats up. If the heating valves are closed, the hot water of the additional heater 14 flows exclusively via the internal combustion engine 10, with the result that the latter heats up very rapidly to operating temperature. A device 34 is provided which produces a vacuum in the coolant circuit 12 at the point 33 at which connection line 15 enters the coolant circuit 12. A nozzle 34 which narrows the cross section of flow above the switching element 17 is arranged in such a way that a vacuum is established at point 33 in the coolant circuit 12 when the internal combustion engine 10 is running. This vacuum has the effect that the heating water heated up by the additional heater 14 is forced into the coolant circuit 12, mixes with the coolant and heats it up.

What is claimed is:

1. A heating system for vehicles having a water cooled internal combustion engine with a water/air heat exchanger connected via a coolant circuit, said heating system also including an additional heating component connected via a connection line to said coolant circuit, said additional heating component includes a thermostatically actuated switching element such that when said additional heating component is operating, the water heated thereby flows exclusively through said heat exchanger at a temperature below that set by said switching element, at a temperature above that set by said switching element the water heated by said additional heating component flows through said heat exchanger and through said combustion engine, wherein the improvement comprises:

a device disposed where the connection line of the additional heating component enters the coolant circuit producing a vacuum thereat to promote the water in the connection line to flow into the coolant circuit.

2. A heating system as set forth in claim 1, wherein said device is comprised of a nozzle that narrows the cross section for the flow through the coolant circuit where said connection line enters said coolant circuit.

3. A method for introducing water heated in an additional heating component to a coolant circuit interconnecting an internal combustion engine and a water/air heat exchanger, said additional heating component being connected via a connection line to said coolant circuit, said additional heating component includes a thermostatically actuated switching element such that when said additional heating component is operating, the water heated thereby flows exclusively through said heat exchanger at a temperature below that set by said switching element, at a temperature above that set by said switching element the water heated by said additional heating component flows through said heat exchanger and through said combustion engine, said method comprises:

producing a vacuum where the connection line of the additional heating component enters the coolant circuit.

4. The method as set forth in claim 3, wherein the step of producing a vacuum includes forming a nozzle that narrows the cross section of the coolant circuit where the connection line is introduced to the coolant circuit to promote the water in said connection line to flow into and mix with the water in said coolant circuit.

* * * * *

UNITED STATES PATENT AND TRADEMARK OFFICE
CERTIFICATE OF CORRECTION

PATENT NO : 6,105,876
DATED : August 22, 2000
INVENTOR(S): Werner Hennrich et al.

It is certified that error appears in the above-identified patent and that said Letters Patent are hereby corrected as shown below:

On the title page:

Column 1, Item [73] Assignee: DaimlerChrysler AG

Signed and Sealed this

Seventeenth Day of April, 2001

Attest:

NICHOLAS P. GODICI

Attesting Officer    Acting Director of the United States Patent and Trademark Office